United States Patent
Saeijs et al.

(10) Patent No.: US 6,760,542 B1
(45) Date of Patent: Jul. 6, 2004

(54) METHOD AND APPARATUS FOR SIMULTANEOUSLY RECORDING AND REPRODUCING REAL TIME INFORMATION ON/FROM A DISC LIKE RECORD CARRIER

(75) Inventors: Ronald W. J. J. Saeijs, Eindhoven (NL); Steven B. Luitjens, Eindhoven (NL); Johannis F. R. Blacquiere, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/423,695
(22) PCT Filed: Mar. 16, 1999
(86) PCT No.: PCT/IB99/00438
§ 371 (c)(1), (2), (4) Date: Mar. 14, 2000
(87) PCT Pub. No.: WO99/48095
PCT Pub. Date: Sep. 23, 1999

(30) Foreign Application Priority Data

Mar. 19, 1998 (EP) ............................................. 98200888

(51) Int. Cl.$^7$ ............................................... H04N 5/781
(52) U.S. Cl. ........................................ 386/125; 386/126
(58) Field of Search ............................. 386/46, 98, 111, 386/112, 125, 126, 83; 369/83

(56) References Cited

U.S. PATENT DOCUMENTS

| 5,579,183 A | 11/1996 | Van Gestel et al. ............ 360/48 |
| 6,240,244 B1 | * 5/2001 | Ikeda .......................... 386/125 |
| 6,430,135 B1 | * 8/2002 | Kelly et al. ..................... 369/83 |

* cited by examiner

Primary Examiner—Huy Nguyen
(74) Attorney, Agent, or Firm—Michael E. Belk

(57) ABSTRACT

Real time information, such as a digital video signal, is supplied and simultaneously received, converted into/from blocks of information in channel's signals and read/written from/onto a disc-like record carrier. Read/write-scheduling algorithms are used for reading/writing blocks of information recorded in fixed sized fragment areas on the record carrier. Typically one writing action and a plurality of readings actions are used in one read/write cycle of either a fixed duration or of a variable duration. The invention provides for reading and writing of edited files and re-ordering of read actions in a read/write cycle.

15 Claims, 5 Drawing Sheets

METHOD AND APPARATUS FOR SIMULTANEOUSLY RECORDING AND REPRODUCING REAL TIME INFORMATION ON/FROM A DISC LIKE RECORD CARRIER

FIELD OF THE INVENTION

The invention relates to the field of recording and reproducing real-time digital information such as digital audio and video information.

BACKGROUND OF THE INVENTION

The invention relates to a method and apparatus for simultaneously recording and reproducing a real time information signal, such as a digital video signal, on a disc like record carrier. The record carrier may be of the magnetic or the optical type. An apparatus for recording a real time information signal, such as an MPEG encoded video information signal, on a record carrier is known from U.S. Pat. No. 5,579,183 (PHN 14818). The record carrier in the said document is in longitudinal form.

Disc like record carriers have the advantage of a short access time. This enables the possibility of carrying out 'simultaneous' recording and reproduction of information signals on/from the record carrier. During recording and reproduction, information should be recorded on/reproduced from the record carrier such that an real time information signal can be recorded on the record carrier and 'at the same time' a real time information signal recorded earlier on the record carrier can be reproduced without any interruption. For such a simultaneously recording and reproducing, it is required to interleave read and write actions such that record and playback channels can guarantee sustained performance at a peak data rate without buffer overflow or underflow. The R/W cycling time should be as short as possible. Short cycle times imply smaller buffer sizes for the read and write buffer and imply shorter response times to user actions.

On a disc like record carrier real-time data may be allocated contiguously within fixed sized fragments while a fragment area may have an arbitrary location on a disc. For a maximum data rate preferably data in a fragment should be written and read in one write action and one read action respectively. This results in a minimum number of jumps of reading or writing means to a new location and therefore to a maximum performance in data rate. This can be referred to as 2-jump scheduling.

However, only a single read and single write action within a R/W cycle is not suitable for seamless reproducing or playback of edited files. With edited playback files, a playback sequence is defined to be a sequence of blocks or portion of blocks of information written in a fragment area. The latter occurs usually around the transition from some part of an original recording to the next part of the same or another recording, as a result of editing. One read action in a R/W cycle may result in reading only a portion of a block of information in a fragment. And this may result in an underflow of a corresponding read buffer.

This disadvantage is avoided with the proposed read/write-scheduling scheme.

The above citations are hereby incorporated in whole by reference.

SUMMARY OF THE INVENTION

The invention aims at providing measures to enable the various requirements, such as the ones described above. In accordance with the invention, the method for simultaneously recording and reproducing real time information signals, such as digital video signals, on/from a disc like record carrier having a data recording portion which is subdivided into fixed sized fragment areas, include:

receiving a first information signal for recording;

processing the first information signal into a channel signal for recording on the disc like record carrier wherein the processing includes converting the first information signal into blocks of information of the channel signal, and wherein the processing is further adapted to convert the first information signal into blocks of information of the channel signal, such that the size of blocks of information can be variable and satisfy the following relationship:

SFA/2≦size of a block of the channel signal≦SFA where SFA equals the fixed size of a block of the fragment area;

writing the channel signal on the disc like record carrier wherein the writing includes writing a block of information of the channel signal in a fragment area on the record carrier;

reading blocks of information of the channel signal from fragment areas of the record carrier;

processing the blocks of information of the channel signal for obtaining a second information signal;

carrying out the simultaneous recording and reproducing in subsequent cycles, a cycle includes:

no more then one write action for contiguously writing a block of information of the channel signal into a fragment area on the record carrier and one or more read actions for contiguously reading each action at least a portion of the block of information of the channel signal from the record carrier.

Further, the apparatus for simultaneously recording and reproducing real time information signals, such as digital video signals, on/from a disc like record carrier having a data recording portion which is subdivided into fixed sized fragment areas, includes:

input apparatus for receiving a first information signal for recording;

first signal processing means for processing the first information signal into a channel signal for recording on the disc like record carrier;

writing apparatus for writing the channel signal on the record carrier;

the first signal processing means being adapted to convert the first information signal into blocks of information of the channel signal, the writing means being adapted to write a block of information of the channel signal in a fragment area on the record carrier, and wherein the processing is further adapted to convert the first information signal into blocks of information of the channel signal, such that the size of blocks of information can be variable and satisfy the following relationship:

SFA/2≦size of a block of the channel signal≦SFA where SFA equals the fixed size of a block of the fragment area;

the apparatus further includes:

reading apparatus for reading blocks of information of the channel signal from fragment areas on the record carrier;

second signal processing apparatus for processing the blocks of information of the channel signal so as to obtain a second information signal;

output apparatus for supplying the second information signal reproduced for the record carrier, the simultaneous reading and writing of the first and second information signals respectively being carried out in subsequent cycles, a cycle including:

no more then one write action for contiguously writing a block of information of the channel signal into a fragment area on the record carrier and one or more read actions for contiguously reading each action at least a portion of the block of information of the channel signal from the record carrier.

Initially a record carrier may be obtained by writing an amount of information, which equals the fragment area size. This results in a maximal efficiency with respect to memory allocation during initial writing of a record carrier. This will be referred to as a full-fragment (FF) condition. With subsequent simultaneous recording and writing, writing of a contiguous amount of information is allowed which equals at least half the fragment size. This will be referred to as a half-fragment (HF) condition. By allowing more than one read action in a R/W cycle, a seamless playback of edited files can now be guaranteed during simultaneously recording while maintaining a high data rate. Since portions of the block of information to be read are no smaller, no more than two additional jumps are needed to read an amount of at least the fragment size.

An advantageous embodiment is characterized by executing maximal three read actions in one cycle. A worst-case R/W cycle has a total of 4 jumps with three read actions for reading respectively a last, a complete and a first portion of a block of information in a fragment. This will be referred to as 4 jump scheduling.

Further advantageous embodiments with the above mentioned full-fragment (FF) condition and half-fragment (HF) condition, are characterized by varying the cycle time. As will be explained hereafter in detail, a maximum of only two read actions in a cycle is obtained resulting in a 3-jump scheduling. Thus reducing the total number of jumps in a cycle and increasing the net data rate or lower the performance requirements.

A first embodiment employing a variable cycle time is obtained by delaying a subsequent write action if a predetermined condition for a read action is not met. By postponing a subsequent write action, in specific cases, reading of a complete portion of a block of information in a fragment can be finished.

Again, in general, without imposing restrictions upon the minimal amount read or written in a cycle, advantageous embodiments employing a varying cycle time are characterized by executing maximal two read actions in one cycle.

A next advantageous embodiment is characterized by ordering the reading of the portions of the bock of information in the cycles such that a total jump time for localizing the fragments in a cycle is minimal.

These and other aspects of the invention will be apparent from and elucidated with reference to the embodiments hereafter in the figure description, in which

DETAILED DESCRIPTION OF THE PREFERRED EMBODIMENT

Figure 1:
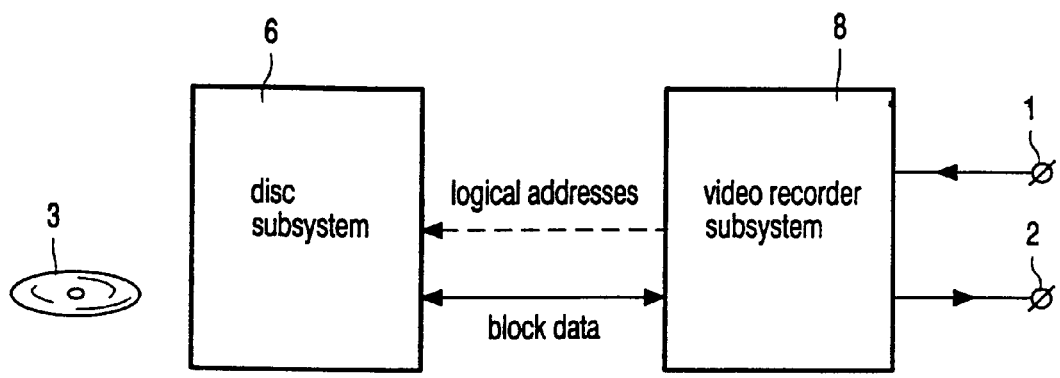
FIG. 1 shows an embodiment of the apparatus.

FIG. 1 shows an embodiment of the apparatus in accordance with the invention. The following figure description, the attention will be focussed on the recording, reproduction and editing of a video information signal. It should however be noted that other types of signal could equally well be processed, such as audio signals, or data signals.

The apparatus includes an input terminal 1 for receiving a video information signal to be recorded on the disc like record carrier 3. Further, the apparatus includes an output terminal 2 for supplying a video information signal reproduced from the record carrier 3. The record carrier 3 is a disc like record carrier of the magnetic or optical form.

The data area of the disc like record carrier 3 consists of a contiguous range of physical sectors, having corresponding sector addresses. This address space is divided into fragment areas. A fragment area is a contiguous sequence of sectors, with a fixed length. Preferably, this length corresponds to an integer number of ECC-blocks included in the video information signal to be recorded.

The apparatus shown in FIG. 1 is shown decomposed into two major system parts, namely the disc subsystem 6 and the what is called 'video recorder subsystem'8. The two subsystems are characterized by the following features:

The disc subsystem can be addressed transparently in terms of logical addresses. It handles defect management (involving the mapping of logical addresses onto physical addresses) autonomously.

For real-time data, the disc subsystem is addressed on a fragment-related basis. For data addressed in this manner the disc subsystem can guarantee a maximum sustainable bit rate for reading and/or writing. In the case of simultaneous reading and writing, the disc subsystem handles the read/write scheduling and the associated buffering of stream data from the independent read and write channels.

For non-real-time data, the disc subsystem may be addressed on a sector basis. For data addressed in this manner the disc subsystem cannot guarantee any sustainable bit rate for reading or writing.

The video recorder subsystem takes care of the video application, as well as file system management. Hence, the disc subsystem does not interpret any of the data that is recorded in the data area of the disc.

In order to realize real time reproduction in all situations the fragment areas introduced earlier need to have a specific size. Also in a situation where simultaneous recording and reproduction takes place, reproduction should be uninterrupted. In the present example, the fragment size is chosen to satisfy the following requirement:

fragment size=4 MB=$2^{22}$ bytes

Figure 2A:
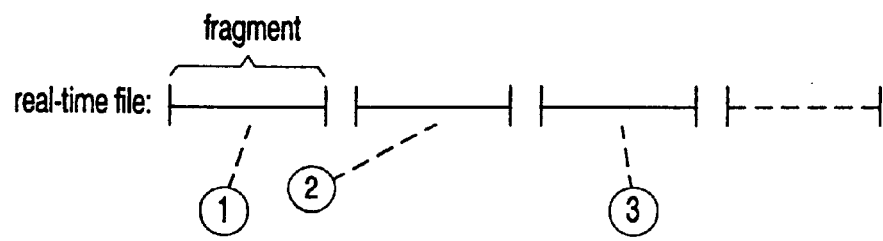
FIG. 2 shows the recording of blocks of information in fragment areas on the record carrier.
Figure 2B:
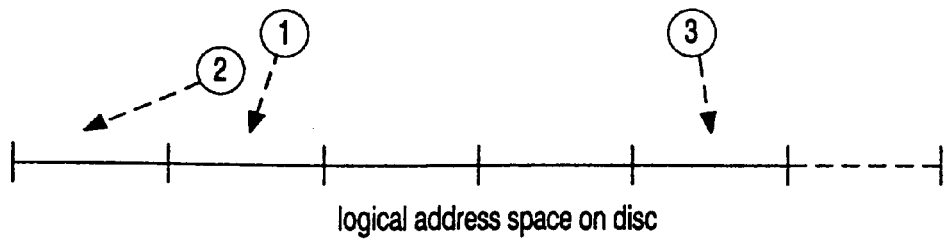

Recording of a video information signal will briefly be discussed hereafter, with reference to FIG. 2. In the video recorder subsystem, the video information signal, which is a real time signal, is converted into a real time file, as shown in FIG. 2a. A real-time file consists of a sequence of signal blocks of information recorded in the corresponding fragment areas. There is no constraint on the location of the fragment areas on the disc and, hence, any two consecutive fragment areas including portions of information of the information signal recorded may be anywhere in the logical address space, as shown in FIG. 2b. Within each fragment area, real-time data is allocated contiguously. Each real-time file represents a single AV stream. The data of the AV stream is obtained by concatenating the fragment data in the order of the file sequence.

Figure 3:
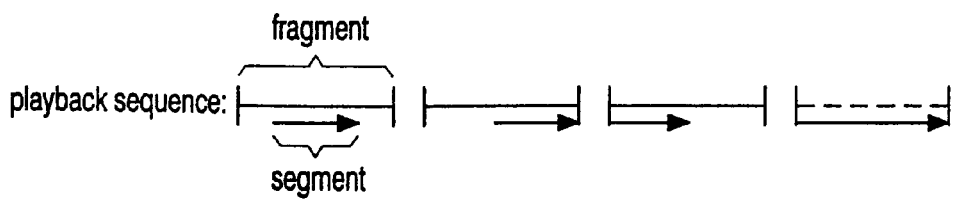
FIG. 3 shows the principle of playback of a video information signal.

Next, playback of a video information signal recorded on the record carrier will be briefly discussed hereafter, with reference to FIG. 3. Playback of a video information signal recorded on the record carrier is controlled by means of what is called 'playback-control-program' (PBC program). In general, each PBC program defines a (new) playback sequence. This is a sequence of fragment areas with, for each fragment area, a specification of a data segment that has to be read from that fragment. Reference is made in this respect to FIG. 3, where playback is shown of only a portion of the first three fragment areas in the sequence of fragment areas in FIG. 3. A segment may be a complete fragment area, but in general it will be just a part of the fragment area. (The latter usually occurs around the transition from some part of an original recording to the next part of the same or another recording, as a result of editing.)

Note, that simple linear playback of an original recording can be considered as a special case of a PBC program: in this case the playback sequence is defined as the sequence of fragment areas in the real-time file, where each segment is a complete fragment area except, probably, for the segment in the last fragment area of the file. For the fragment areas in a playback sequence, there is no constraint on the location of the fragment areas and, hence, any two consecutive fragment areas may be anywhere in the logical address space.

Figure 4:
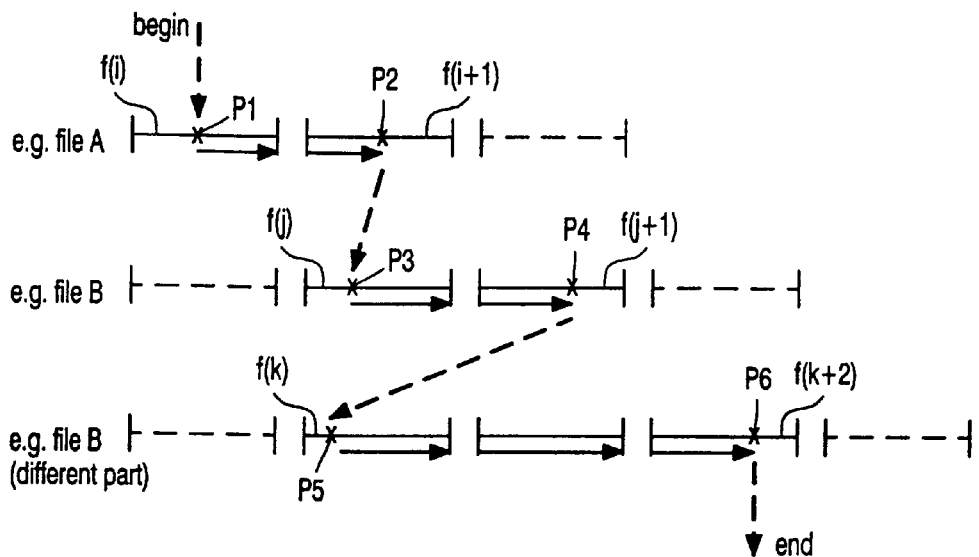
FIG. 4 shows the principle of editing of video information signals.

Next, editing of one or more video information signals recorded on the record carrier will be briefly discussed hereafter, with reference to FIG. 4. FIG. 4 shows two video information signals recorded earlier on the record carrier 3 indicated by two sequences of fragments named 'file A' and 'file B'. For realizing an edited version of one or more video information signals recorded earlier, a new PBC program should be realized for defining the edited AV sequence. This new PBC program thus defines a new AV sequence obtained by concatenating parts from earlier AV recordings in a new order. The parts may be from the same recording or from different recordings. In order to play back a PBC program data from various parts of (one or more) real-time files has to be delivered to a decoder. This implies a new data stream that is obtained by concatenating parts of the streams represented by each real-time file. In the FIG. 4, this is illustrated for a PBC program that uses three parts, one from the file A and two from the file B.

FIG. 4 shows that the edited version starts at a point $P_1$ in the fragment area f(i) in the sequence of fragment areas of figure A and continues until point $P_2$ in the new fragment area f(i+1) of file A. Then reproduction jumps over to the point $P_3$ in the fragment area f(j) in file B and continues until point $P_4$ in fragment area f(j+2) in file B. Next reproduction jumps over to the point $P_5$ in the same file B, which may be a point earlier in the sequence of fragment areas of file B than the point $P_3$, or a point later in the sequence than the point $P_4$.

Next, a condition for seamless playback during simultaneous recording will be discussed. In general, seamless playback of PBC programs can only be realized under certain conditions. The most severe condition is required to guarantee seamless playback while simultaneous recording is performed. One simple condition for this purpose will be introduced. It is a constraint on the length of the data segments that occur in the playback sequences, as follows: In order to guarantee seamless simultaneous play of a PBC program, the playback sequence defined by the PBC program shall be such that the segment length in all fragments (except the first and the last fragment area) shall satisfy:

$$2MB \leq \text{segment length} \leq 4 \text{ MB}$$

The use of fragment areas allows one to consider worst-case performance requirements in terms of fragment areas and segments (the signal blocks stored in the fragment areas only), as will be described hereafter. This is based on the fact that single logical fragments areas, and hence data segments within fragment areas, are guaranteed to be physically contiguous on the disc, even after remapping because of defects. Between fragment areas, however, there is no such guarantee: logically consecutive fragment areas may be arbitrarily far away on the disc. As a result of this, the analysis of performance requirements concentrates on the following:

a. For playback, a data stream is considered that is read from a sequence of segments on the disc. Each segment is contiguous and has an arbitrary length between 2 MB and 4 MB, but the segments have arbitrary locations on the disc.

b. For recording, a data stream is considered that is to be written into a sequence of 4 MB fragment areas on the disc. The fragment areas have arbitrary locations on the disc.

Note that for playback, the segment length is flexible. This corresponds to the segment condition for seamless play during simultaneous record. For record, however, complete fragment areas with fixed length are written.

Given a data stream for record and playback, we will concentrate on the disc subsystem during simultaneous record and playback. It is assumed that the video recorder subsystem delivers data with a peak user rate R to the disc subsystem for recording. Likewise, it accepts data with a peak user rate R from the disc subsystem for playback. It is also assumed that the video recorder subsystem delivers a sequence of segment addresses for both the record and the playback stream well in advance.

For simultaneous recording and playback, the disc subsystem has to be able to interleave read and write actions such that the record and playback channels can guarantee sustained performance at the peak rate without buffer overflow or underflow. In general, different R/W scheduling algorithms may be used to achieve this. There are, however, strong reasons to do scheduling in such a way that the R/W cycle time at peak rates is as short as possible:

Shorter cycle times imply smaller buffer sizes for the read and write buffer, and hence for the total memory in the disc subsystem.

Shorter cycle times imply shorter response times to user actions. As an example of response time consider a situation where the user is doing simultaneous recording and playback and suddenly wants to start playback from a new position. In order to keep the overall apparatus response time (visible to the user on his screen) as short as possible, it is important that the disc subsystem is able to start delivering stream data from the new position as soon as possible. Of course, this must be done in such a way that, once delivery has started, seamless playback at peak rate is guaranteed. Also, writing must continue uninterruptedly with guaranteed performance.

For the analysis here, a scheduling approach is assumed, based on a cycle in which one complete fragment area is written. For the analysis of drive parameters below, it is sufficient to consider the minimum cycle time under worst-case conditions. Such a worst-case cycle consists of a writing interval in which a 4 MB segment is written, and a reading interval in which at least 4 MB is read, divided over one or more segments. The cycle includes at least two jumps (to and from the writing location), and possibly more, because the segment lengths for reading are flexible and may be smaller than 4 MB. This may result in additional jumps from one read segment location to another. However, since read segments are no smaller than 2 MB, no more than two additional jumps are needed to collect a total of 4 MB.

Figure 5:
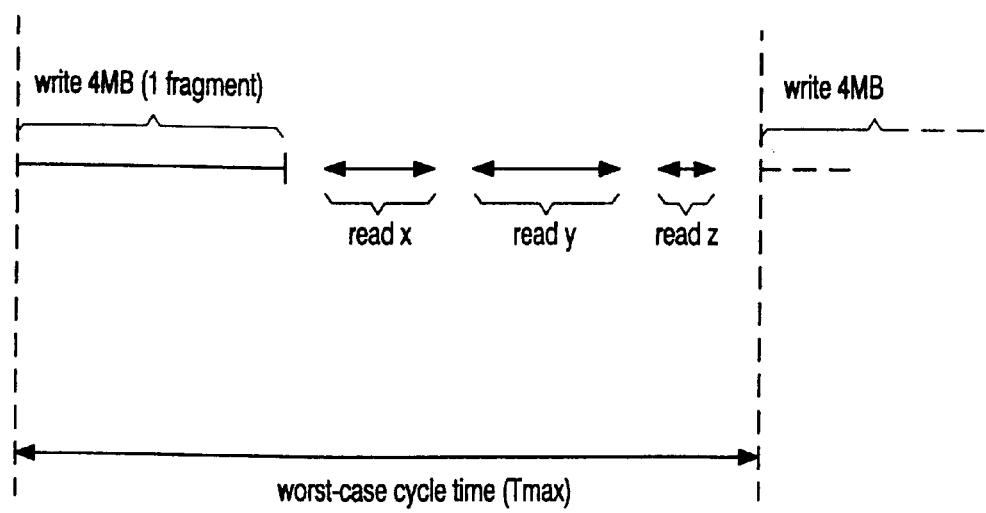
FIG. 5 shows a R/W cycle with one write action and three read actions.

As illustrated in FIG. 5, a worst-case R/W cycle has a total of four jumps. In this FIG. 5, x denotes the last part of a read segment, y denoted a complete read segment, with length between 2 MB and 4 MB, and z denotes the first part of a read segment and the total size of x, y and z is again 4 MB in the present example.

In general, the required drive parameters to achieve a guaranteed performance for simultaneous recording and playback depend on major design decisions such as the rotational mode etc. These decisions in turn depend on the media characteristics.

The above-formulated conditions for seamless play during simultaneous record are derived such that they can be met by different designs with realistic parameters. In order to show this, we discuss the example of a CLV (constant linear velocity) drive design here.

In the case of a CLV design, transfer rates for reading and writing are the same and independent of the physical location on the disc. Therefore, the worst-case cycle described above can be analyzed in terms of just two drive parameters: the transfer rate $R_t$ (to be distinguished from the peak user rate R; $R_t$ may also referred to as the data rate of the bit engine while R may be referred to as the data rate of a multiplexed stream) and the worst-case all-in access time $\tau$. The worst-case access time $\tau$ is the maximum time between the end of data transfer on one location and the begin of data transfer on another location, for any pair of locations in the data area of the disc. This time covers speed-up/down of the disc, rotational latency, possible retries etc., but not processing delays etc.

For the worst-case cycle described in the previous section, all jumps may be worst-case jumps of duration $\tau$. This gives the following expression for the worst-case cycle time:

$$T_{max} = 2F/R_t + 4\tau \quad [1]$$

where F is the fragment size: F=4 MB
In order to guarantee sustainable performance at peak user rate R, the following should hold:

$$F \geq R \cdot T_{max} \quad [2]$$

This yields:

$$R \leq F/T_{max} = R_t \cdot F/2 \cdot (F + 2R_t \tau) \quad [3]$$

As an example, with $R_t$=35 Mbps and $\tau$=500 ms, we would have: $R \leq 8.36$ Mbps and $T_{max}$=3.83 s Next a read/write cycle in combination with a stored sequence of video information in fragments will be briefly discussed hereafter, with reference to FIG. 6

Figure 6A:
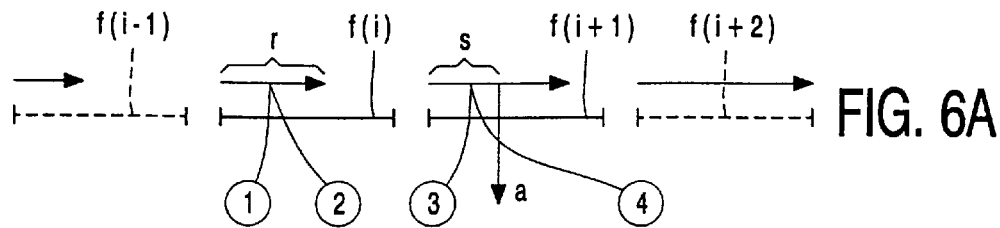
FIG. 6 shows an example of R/W cycles in relation with an edited sequence of information signals.

FIG. 6a shows a sequence of fragment areas . . . , f(i−1), f(i), f(i+1), f(i+2), . . . of a stream. The edited video information signal consists of the portion of the stream preceding an exit point a in fragment area f(i+1). It is assumed that a is such a point that it would be possible to make a straightforward concatenation of data from this stream (ending at the exit point a) and data from another stream or the same stream. This implies that, in this example, the length l(s) of the portion of the segment s which ends at point a, is at least 2 MB.

It is also assumed that concatenation of stream data at the exit point a is sufficient to create a valid AV stream. In general, however, some re-encoding has to be done in order to create a valid AV stream. This is usually the case if the exit and entry points are not at GOP boundaries, when the encoded video information signal is an MPEG encoded video information signal.

Figure 6B:
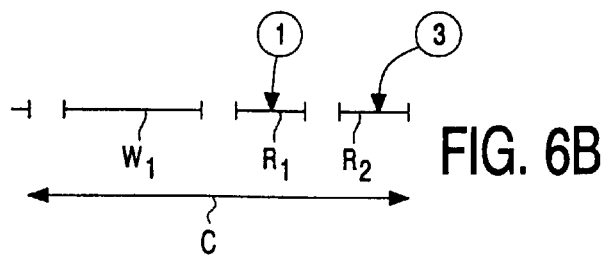

FIG. 6b illustrates a first example of a read/write cycle C comprising a write action W1 and two read actions R1 and R2. With read action R1 the portion of video information denoted with r of the fragment f(i) is read and with read action R2 the portion of video information denoted with s of the fragment f(i+1) is read. However, dependent on the size of the data to be read, reading may extend over two read/write cycles C.

Figure 6C:
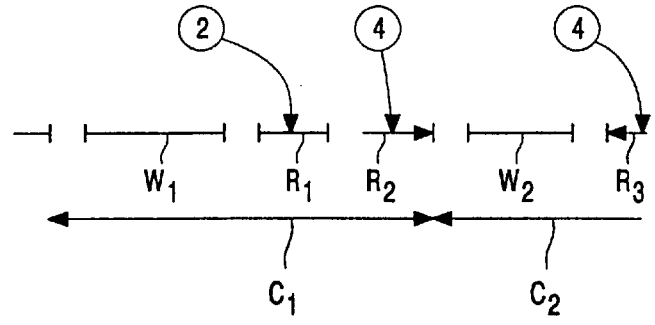

An example is given in FIG. 6c, where the portion of video information denoted with s of the fragment f(i+1) is read with two read actions R2 and R3 in two read/write cycles C1 and C2 respectively.

Next to the first scheduling action for simultaneously read and write which have already been discussed with reference to FIG. 5, other scheduling actions will be briefly discussed hereafter.

Hereby it remarked that a number of assumptions are made:

A drive works with constant linear velocity (CLV) which implies a direct influence on jump time.

Symmetrical read and write bit rates are assumed.

Fixed bit rates for as well the input as the output stream. It is remarked that the disclosed embodiments hereafter are adapted to deal with fixed bit rates as well as with variable bit rates. However, only the worst case situation is described with the highest data rate and a most disadvantageous arrangement of data.

Re-ordering is not considered at first.

Multiple channel playback or multiple channel record is not considered.

Figure 7:
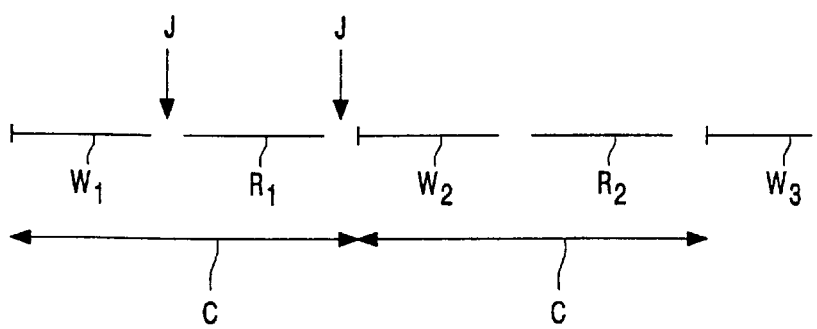
FIG. 7 shows a R/W cycle with one write action and one read action.

For comparison with the scheduling action discussed with reference to FIG. 5 (which will be referred to as '4-jump scheduling') a simple scheduling algorithm is illustrated with reference to FIG. 7. The scheduling obeys the so-called full fragment condition. This condition implies that all segments in a fragment sequence (except the first and the last one) have a length equal to the fragment size. This may be used for 'original' files or truncated versions of 'original' files. A read/write cycle C is defined as a write action W1 followed by a read action R1. For maximum sustainable performance it's needed to write a complete fragment in one action and to read a complete fragment in one action. Two jumps J are required each cycle C; therefore this scheduling will be referred to as '2-jump scheduling'. A jump J occurs when accessing a next location on a disc for reading or writing which is not contiguous with the previous location in a physical address space. A jump involves an access time which is defined as a worst-case access time τ which is the maximum time between the end of data transfer on one location and the begin of data transfer on another location, for any pair of locations in the data area of the disc.

As done already with respect to the 4-jump scheduling illustrated with reference to FIG. 5, the following expression for the worst-case cycle time $T_{max}$ is obtained:

$$T_{max}=2F/R_t+2.\tau \qquad [4]$$

with F the fragment size.
The peak user rate R is given by:

$$R \leq F/T_{max}=R_t.F/2.(F+R_t.\tau) \qquad [5]$$

As an example, with $R_t$=35 Mbps, F=4 MB/32 Mb and τ=500 ms, we would have: R≤11.31 Mbps and $T_{max}$=2.83 s.

Next a third scheduling algorithm will be discussed with reference to FIG. 8.

Figure 8A:
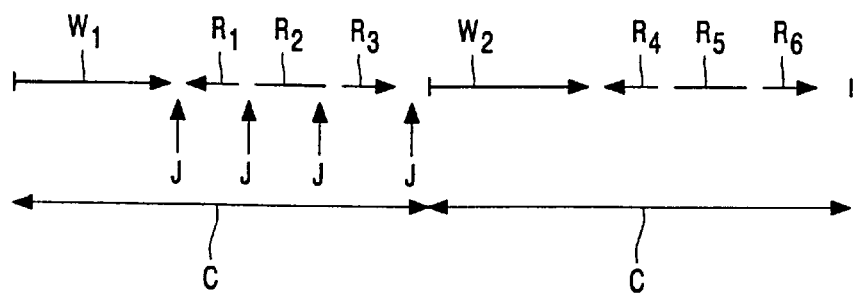
FIG. 8 shows a R/W cycle with a variable cycle time comprising one write action and two read actions.

FIG. 8A depicts, for comparison, again the 4-jump scheduling as discussed with reference to FIG. 5. Herein denotes W1 a writing of a first fragment, R1 denotes the last part of a read segment, R2 denotes a complete read segment and R3 denotes the first part of a read segment. Further is valid:

$$R1+R2+R3 \geq F \qquad [6]$$

(i.e. minimal equal to one fragment size).

Figure 8B:
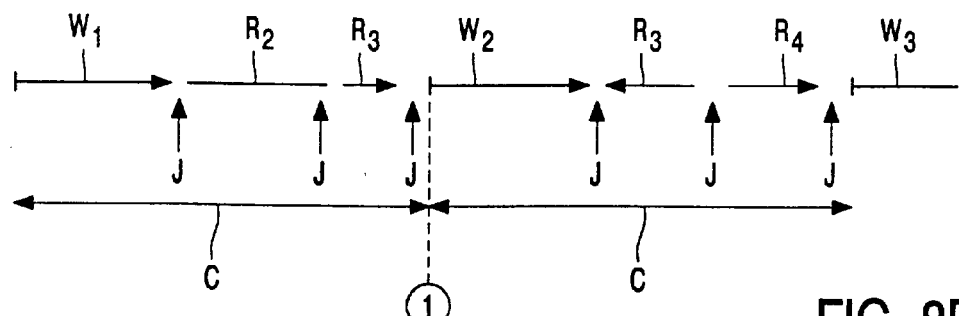
Figure 8C:
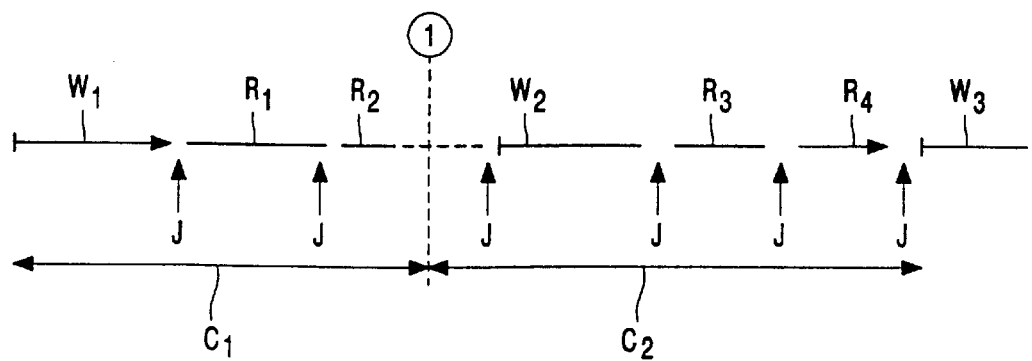

FIG. 8B and FIG. 8C are showing a scheduling algorithm that is also suited for full fragment write and half-fragment read and therefore suitable for seamless edited file play back. However, the main difference with the 4-jump scheduling algorithm as depicted in FIG. 8A is, that a write action W2 can be delayed if in the preceding read action R2 the remaining portion to be read is smaller than F/2. Two possible situations may then occur. One where the read action is terminated, which is illustrated in FIG. 8A with termination of R2 and R4 and one where the write action is postponed, which is illustrated in FIG. 8C with postponement of W2.

In FIG. 8B W1 and W2 denote a write cycle, R1 denotes one complete segment and R2 and R3 denote together one segment. Further is valid:

$$R1 \geq F/2;\ R1+R2 \geq F;\ F/2 \leq R2+r3 \leq F \qquad [7]$$

In FIG. 8C W1 and W2 also denote a write cycle while R1, R2 and R3 each denote one complete segment. Further is valid:

$$R1 \geq F/2;\ R2 \geq F/2;\ R3 \geq F/2 \qquad [8]$$

The read action R4 is dependent on R1, R2 and R3. In the situation that the writing is postponed (FIG. 8C), it is possible that (R1+R2+R3) is in the order of 2F. In relation with the fill rate of a read buffer, this may lead to skipping of R4. As the write action can be postponed, this scheduling algorithm has no fixed cycle time: the cycle C1 differs in duration from the cycle C2. However, as the mean data flows are known, something can be said about the mean cycle time. However, a calculation is not precise, as some of the cycles C may include only two jumps J (as one read action such as R4 may be skipped). This results in the following mean cycle time:

$$T_{max}=2F/R_t+3.\tau \qquad [9]$$

And the following mean peak user rate:

$$R \leq F/T_{max}=R_t.F/2(F+1.5.R_t.\tau) \qquad [10]$$

Again, as an example with $R_t$=35 Mps, τ=500 ms and F=4 MB, we would have: R≤9.61 Mbps and $T_{max}$=3.33 s.

The scheduling algorithm described with reference to FIG. 8B and FIG. 8C will be referred to as 3-jump scheduling.

Figure 9:
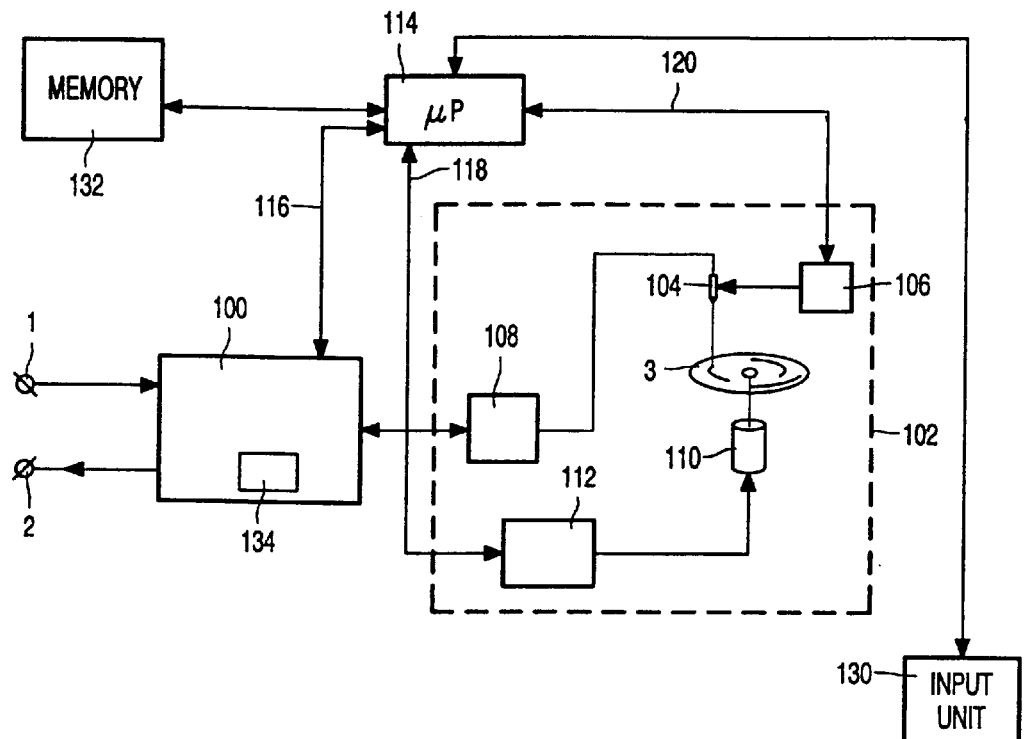
FIG. 9 shows a further elaboration of an apparatus for simultaneous reading and writing.

FIG. 9 shows a schematic version of an apparatus for simultaneous read/write in more detail. The apparatus comprises a signal-processing unit 100, which is incorporated in the subsystem 8 of FIG. 1. The signal processing unit 100 receives the video information signal via the input terminal 1 and processes the video information into a channel signal for recording the channel signal on the disc like record carrier 3. Further, a read/write unit 102 is available which is incorporated in the disc subsystem 6. The read/write unit 102 comprises a read/write head 104, which is in the present example an optical read/write head for reading/writing the channel signal on/from the record carrier 3. Further, positioning means 106 are present for positioning the head 104 in a radial direction across the record carrier 3. A read/write amplifier 108 is present in order to amplify the signal to be recorded and amplifying the signal read from the record carrier 3. A motor 110 is available for rotating the record carrier 3 in response to a motor control signal supplied by a motor control signal generator unit 112. A microprocessor 114 is present for controlling all the circuits via control lines 116, 118 and 120.

The signal processing unit 110 is adapted to convert the video information received via the input terminal 1 into blocks of information of the channel signal having a specific size. The size of the blocks of information (which is the segment mentioned earlier) can be variable, but the size is such that it satisfies the following relationship:

SFA/2 ≤ size of a block of the channel signal ≤ SFA, where SFA equals the fixed size of the fragment areas. In the example given above, SFA=4MB. The write unit 102 is adapted to write a block of information of the channel signal in a fragment area on the record carrier.

In order to enable editing of video information recorded in an earlier recording step on the record carrier 3, the apparatus is further provided with an input unit 130 for receiving an exit position in a first video information signal recorded on the record carrier and for receiving an entry position in a second video information signal recorded on that same record carrier. The second information signal may be the same as the first information signal. Further, the apparatus includes a memory 132, for storing information relating to the exit and entry positions.

Further, the PBC programs obtained in the edit step can be stored in a memory incorporated in the microprocessor 114, or in another memory incorporated in the apparatus. The PBC program created in the edit step for the edited video information signal will be recorded on the record carrier, after the editing step has been terminated. In this way, the edited video information signal can be reproduced by a different reproduction apparatus by retrieving the PBC program from the record carrier and reproducing the edited video information signal using the PBC program corresponding to the edited video information signal.

In this way, an edited version can be obtained, without re-recording portions of the first and/or second video information signal, but simply by generating and recording one or more bridging segments into corresponding (bridging) fragment areas on the record carrier.

A further improvement to the simultaneous recording and playback mode, described above with reference to FIG. 5, will be described hereafter. It should be noted here, that the improved simultaneous recording and playback method described hereafter can be applied in recording/reproduction apparatuses that need not be equipped with the other features described above.

The read time for reading the portions x, y and z, shown in FIG. 5, can be further decreased by re-ordering the read steps of the portions x, y and z, into a, b and c, with {a,b,c}={x,y,z}, such that the time required for reaching and reading the portions x, y and z, inclusive the jump times between the reading steps of reading the portions x, y and z, and inclusive the jump to the position where the next fragment area should be recorded, is minimal. Large jumps in the radial direction of the record carrier in a CLV system requires large speed variations of the rotational speed of the record carrier and thus require a large response time before the record carrier has reached its required rotational speed after a jump. Thus, by minimizing in fact the total time required for the jumps in a complete cycle, the lowest worst-case cycle time $T_{max}$ can be obtained.

The improvement can be realized in the following way, namely if the new order is such that the movement defined by jumping from the last fragment area written to the fragment area from which the first portion to be read should be recovered, after having read the first portion, jumping to the fragment area from which the next portion to be read should be recovered, after having read the second portion, jumping to the fragment area from which the third portion to be read should be recovered, after having read the third portion, jumping to the position of the fragment area in which the next portion of the information signal should be recorded, never crosses any radius more than twice. As a result, the total adjustment of the revolution speed of the record carrier amounts to no more than the equivalent of one speed-up/down sweep.

Figure 10A:
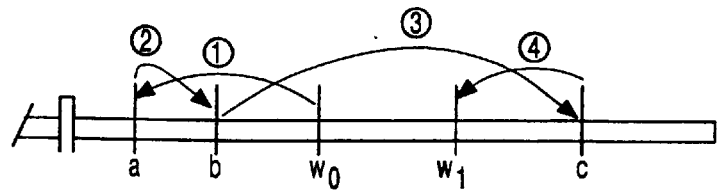
FIG. 10 shows two examples of a re-ordering of read actions in one cycle in which information is written and 'simultaneously' read on/from the record carrier.
Figure 10B:
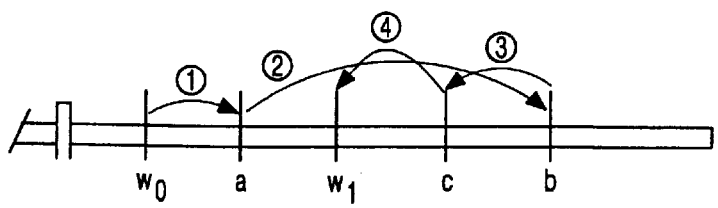

FIG. 10 shows two examples of jumps in a cycle. In FIG. 10a, after having written a 4 MB fragment, the writing step indicated by $w_0$ in FIG. 10a, the system jumps to the position indicated by a, where one of the portions x, y and z, is recorded, for reading the portion. Next, the system jumps to b, the position where the other portion of the portions x, y and z, is recorded, for reading the portion. Next, the system jumps to c, the position where the last of the portions x, y and z is recorded, for reading the portion. Next, the system jumps to the position $w_1$, indicating the position where the next 4 MB fragment is recorded. FIG. 10b shows the same, for a different location of the various positions on the record carrier.

The upper bound for worst-case all-in jump time in total cycle (four jumps):

$$t(w_0 \to a)+t(a \to b)+t(b \to c)+t(c \to w^1) \leq t_{max4}$$

An example of an upper bound approximation from basic drive parameters: maximum CLV speed (speed up/down) access time 500 ms, and maximum CAV (constant angular velocity) access time 200 ms, results in $t_{max4} \leq 1.4$ s. Maximum sustainable user rate:

$$R \leq F/T_{max}=R_t F/2(F+2 \cdot R_t \tau).$$

With $\tau=0.25$ $t_{max4}=350$ ms and $R_t=35$ Mbps, this results in $R \leq 10.1$ Mbps.

The earlier calculation of the user rate resulted in $R \leq 8.57$ Mbps. As shown in the above calculation, based on the same drive parameters, the re-ordering allows for a higher user rate, namely $\leq 10.1$ Mbps.

Whilst the invention has been described with reference to preferred embodiments thereof, it is to be understood that these are not limitative examples. Thus, various modifications may become apparent to those skilled in the art, without departing from the scope of the invention, as defined by the claims. In this respect, it should be noted that first generation apparatuses in accordance with the invention, capable of carrying out recording and reproduction of a real time information signal, may be capable of recording signal blocks of fixed size SFA in the fragment areas only, whilst they are already capable of reproducing and processing signal blocks of variable size from the fragment areas in order to reproduce a real time information signal from a record carrier that has signal blocks of variable size stored in the fragment areas. Second generation apparatuses that are moreover capable of carrying out an editing step will be capable of recording signal blocks of variable size in the fragment areas.

Further, the invention lies in each and every novel feature or combination of features. The scope of the invention is not limited to the embodiments, any reference signs do not limit the scope of the claims and the invention can be implemented by means of both hardware and software, and that several "means" may be represented by the same item of hardware. Furthermore, the word 'comprising' does not exclude the presence of other elements or steps than those listed in the claims.

What is claimed is:

1. A method for simultaneously receiving and supplying real time information signals while recording and reproducing the information signals on/from a disc like record carrier, comprising:

receiving a first information signal for recording;

processing the first information signal into a first channel signal for recording on the disc like record carrier the first information signal being converted into blocks of information of the channel signal, $SFA/2 \leq$ size of a block of the channel signal $\leq SFA$, where SFA equals the fixed size of a block of a fragment area;

writing the first channel signal on the disc like record carrier wherein the writing includes writing a block of information of the first channel signal in the fragment area in a data recording portion on the record carrier the data recording portion being divided into fixed size fragment areas;

reading blocks of information of second channel signal from fragment areas of the record carrier;

processing the blocks of information of the second channel signal for obtaining a second information signal;

supplying the second information signal while simultaneously receiving the first information signal, and recording and reproducing the channel signals in subsequent cycles, a cycle including:

no more than one write action for contiguously writing a block of information of the first channel signal into a fragment area on the record carrier and one or more read actions for contiguously reading each action at least a portion of the block of information of the second channel signal from the record carrier.

2. The method of claim 1, in which a maximum of three read actions are executed in any one cycle.

3. The method of claim 1, in which the cycle time varies.

4. The method of claim 3, in which a subsequent write action is delayed if a predetermined condition for a read action is not met.

5. The method of claim 4, the subsequent write action is delayed if the remaining portion to be read in the preceding read action is smaller than half the fragment size.

6. The method of claim 4, in which a maximum of two read actions are executed in one cycle.

7. The method of claim 1, in which the reading of the portions in the cycles are ordered such that a total jump time for localizing the fragments in a cycle is minimal.

8. An apparatus for simultaneously receiving and supplying real time information signals and recording and reproducing the information signals on/from a disc like record carrier, comprising:

input means for receiving a first information signal for recording;

first signal processing means for processing the first information signal into a first channel signal for recording on the disc like record carrier, including converting the first information signal into blocks of information of the channel signal, $SFA/2 \leqq$ size of a block of the channel signal $\leqq SFA$ where SFA, equals the fixed size of a block of a fragment area on the record carrier;

writing means for writing the channel signal on the record carrier in fixed size fragment areas of a data recording portion of the record carrier;

reading means for reading blocks of information of a second channel signal from the fragment areas on the record carrier;

second signal processing means for processing the blocks of information of the second channel signal so as to obtain a second information signal;

output means for supplying the second information signal reproduced for the record carrier while simultaneously receiving the first information signal, the reading and writing of the first and second channel signals respectively being carried out in subsequent cycles, a cycle including:

no more than one write action for contiguously writing a block of information of the channel signal into a fragment area on the record carrier; and one or more read actions for contiguously reading in each action at least a portion of the block of information of the channel signal from the record carrier.

9. The apparatus of claim 8, in which the reading means are adapted to execute a maximum of three read actions in one cycle.

10. The apparatus of claim 8, in which, the cycle time is variable.

11. The apparatus of claim 10, in which, the writing means are adapted for delaying a subsequent writing action if a predetermined condition for a read action is not met.

12. The apparatus of claim 11, in which, the writing means are adapted for delaying the subsequent write action if the remaining portion to be read in the preceding read action is smaller than half the fragment size.

13. The apparatus of claim 11, in which the reading means are adapted for executing a maximum of two read actions in one cycle.

14. The method of claim 1 in which the size of the information blocks of the channel signals vary.

15. The apparatus of claim 8 in which the processing means is adapted for varying the size of the information blocks of the channel signals.

* * * * *